United States Patent
Reynard et al.

(10) Patent No.: US 6,975,226 B2
(45) Date of Patent: Dec. 13, 2005

(54) MASTER CONTROL PANEL FOR LOADING DOCK EQUIPMENT

(75) Inventors: Terence Reynard, London (CA); James C. Alexander, London (CA)

(73) Assignee: SPX Dock Products Inc., Sussex, WI (US)

(*) Notice: Subject to any disclaimer, the term of this patent is extended or adjusted under 35 U.S.C. 154(b) by 105 days.

(21) Appl. No.: 10/124,593

(22) Filed: Apr. 18, 2002

(65) Prior Publication Data

US 2003/0199996 A1 Oct. 23, 2003

(51) Int. Cl.[7] .............................................. G08B 21/00
(52) U.S. Cl. ..................... 340/540; 340/526; 340/686.1; 340/933; 340/309.5
(58) Field of Search ................................. 340/540, 507, 340/521, 526, 686.1, 687, 933, 309.5

(56) References Cited

U.S. PATENT DOCUMENTS

| | | | | |
|---|---|---|---|---|
| 4,843,373 A | * | 6/1989 | Trickle et al. .............. | 340/540 |
| 5,007,211 A | * | 4/1991 | Ouellet ........................ | 52/2.12 |
| 5,452,489 A | * | 9/1995 | Gelder et al. ................. | 14/69.5 |
| 5,803,701 A | * | 9/1998 | Filiberti et al. ............. | 700/215 |
| 5,831,540 A | * | 11/1998 | Sullivan et al. ............. | 340/679 |
| 6,329,931 B1 | * | 12/2001 | Gunton ........................ | 340/933 |

* cited by examiner

Primary Examiner—Jeffery Hofsass
Assistant Examiner—Daniel Previl
(74) Attorney, Agent, or Firm—Baker & Hostetler LLP

(57) ABSTRACT

A unified docking apparatus is provided. It includes a single set of controls to operate a vehicle restraint, a dock door, a barrier device, a dock seal, and a loading light. Some optional embodiments include selector switch to select which apparatus the single set of controls will control. Other optional embodiments automatically select the apparatus to be controlled by the single set of controls. A method of operating a docking apparatus using a single set of controls is also provided.

18 Claims, 8 Drawing Sheets

MASTER CONTROL PANEL FOR LOADING DOCK EQUIPMENT

FIELD OF THE INVENTION

The present invention relates generally to control panels for loading dock equipment. More particularly, the present invention relates to a simplified and unified control panel for operating loading dock equipment.

BACKGROUND OF THE INVENTION

This invention is a master control panel which simplifies the operation of loading dock equipment. In addition to having a dock leveler and overhead door, a loading dock may also have a vehicle restraint, loading light, barrier gate and inflatable shelter. If the various devices are power operated rather than manually operated, the wall beside the doorway may be cluttered with various control panels. Not only is the space between doors often very restricted, but the cost of the electrical installation can be significant. This situation can be improved with the installation of a combination control panel which includes all of the controls in a single enclosure. The combination panel not only saves space but may also reduce the cost of electrical installation. One criticism of existing combination panels has been that the operator may be confused by the various number of switches and push buttons, and the proper sequence of operation.

Description of Related Art

FIG. 1 illustrates a loading dock with a driveway 1, dock wall 2, dock floor 3. A pit 4 is recessed in the floor 3. A dock leveler assembly 10 has a deck assembly 11, and a frame assembly 12 which is mounted in the pit 4. Lip keepers 14 are mounted to the front of the frame. The rear of a deck assembly 11 pivots on the frame assembly 12 and has a lip hinge 13 at the front. A lip assembly 15 is supported at one end by the lip hinge 13 and has the other end resting on the lip keepers 14.

The doorway of the loading dock can be closed by a movable door 18, shown partially open. A vehicle restraint assembly 20 is mounted to the wall 2 and has a hook 21, which moves vertically to engage the ICC bar of a truck or tractor trailer (not shown). A light assembly 23 is mounted beside the doorway and has a red light 24 and a green light 25 to signal the truck driver. Two signs 26 and 27 instruct the driver to move only when the green light is illuminated. The sign 26 has reversed lettering to be legible when viewed in the truck mirror. A loading light 28 is mounted beside the doorway to illuminate the interior of the trailer during loading. A barrier gate assembly 30 has a barrier arm 31 which moves from a horizontal position where it prevents access to the doorway to a vertical position where it allows access to the doorway.

An inflatable shelter assembly 35 has two side bags 36 and a head bag 37 which are inflated by a motor and blower (not shown). When a truck or trailer is at the dock, the bags inflate to form a seal between the truck or trailer and the dock wall.

FIG. 2 demonstrates a typical loading dock area with control panels for a hydraulic dock leveler, electric vehicle restraint and power operated door. The dock leveler control panel 40 has three buttons, button 41 raises the dock leveler deck assembly 11, button 42 extends the hinged lip plate 15, and button 43 is an Emergency Stop which stops all of the dock leveler functions. The vehicle restraint control panel 50 has a selector switch 51, an engage button 52 and a release button 53. Three lights 55, 56 and 57 which are red, amber and green respectively, indicate to the dock operator the status of the vehicle restraint. The selector switch 51 has three positions, Off, On, and Lights Only, which allows the operator to bypass the vehicle restraint if the truck or trailer cannot be captured by the vehicle restraint and must be restrained by wheel chocks. The door control panel 60 has three buttons, an Open button 61, a Close button 63 and a Stop button 62.

The normal operating sequence of the equipment is as follows:

When the dock is not in use, the exterior green light 25 is illuminated to indicate that the truck driver may approach or leave the dock. The interior red light 55 is illuminated to indicate that the dock is not in a condition for use. The operator selects the vehicle restraint control panel 50 and presses the engage button 52. The vehicle restraint hook 21, of FIG. 1, rises to engage the truck or trailer. When the hook 21 starts to rise, the exterior red light 24 is illuminated to indicate that the truck driver cannot leave. When the truck or trailer has been effectively restrained, the interior green light 57 is illuminated to indicate that the dock is ready to use. If the vehicle restraint 20 cannot restrain the trailer, the dock operator must manually chock the truck or trailer wheels. The operator may then turn the selector switch 51 from On to Lights Only. Both the interior green light 55 and amber light 56 are now illuminated to indicate that the dock is safe to use, but that the operator should use greater caution because the vehicle restraint 20 has not engaged the truck or trailer.

The operator selects the door control panel 60 and presses the Door Open button 61 to open the door 18.

The operator selects the dock leveler control panel 40 and presses the Raise button 41 to raise the deck assembly 11, extend the lip assembly 15, and releases the button to lower the leveler onto the trailer. Pressing the Lip Extend button 42 allows faster operation by causing the lip 15 to extend before the deck assembly 11 is fully raised. Pressing the Emergency Stop button 43 causes the dock leveler to stop so that it will not descend on top of any misplaced cargo.

If a loading light 28 is installed it may have a manual switch or may be automatically turned on when the door is opened. Similarly, an inflatable shelter 35 may be operated by a manual switch or be automatically turned on when the door is opened.

When the loading operation is finished, the operating sequence is reversed.

The operator presses the dock leveler Raise button 41 to raise the deck assembly 11, fold the lip assembly 15 and then releases the button to lower the dock leveler to the stored position.

The operator presses the Door Close button 63 to close the door 18. Pressing the Stop button 62 causes the door to stop before it closes.

The operator presses the Release button 53 and the vehicle restraint hook 21 lowers to release the trailer. When the hook 21 starts to lower, the interior red light 55 is illuminated to indicate that the dock is not ready for use. When the hook is fully lowered, the exterior green light 25 is illuminated to indicate that the truck driver may leave.

FIG. 3 demonstrates a typical combination control panel with controls for a hydraulic dock leveler, electric vehicle restraint and power operated door. The control buttons and switches have the identical functions of the separate panels in FIG. 2. Often, a Programmable Logic Controller (PLC) is used to allow many different control sequences and interconnect relationships. A PLC accepts input signals from various devices such as limit switches and push buttons and then transmits output signals to various devices such as lights, relays and motors in accordance with the logic defined by the control program. The use of a PLC is well known in the loading dock industry and the specific electrical circuits and program statements are not shown nor discussed herein.

Although the control buttons and switches are arranged in functional groups and are clearly labeled, an untrained operator may find that the number of buttons and their differing locations make the proper sequence of operations seem confusing. Therefore, this invention provides a combination panel with all of the advantages of compact space and economical installation, and with a simplified operating sequence.

Accordingly, it is desirable to provide a simplified combination panel for controlling loading dock equipment and a method for operating loading dock equipment with a simplified control panel.

SUMMARY OF THE INVENTION

It is therefore a feature and advantage of the present invention to provide a combination panel with all of the advantages of compact space and economical installation, but with a simplified operating sequence.

The above mentioned features, and other features and advantages are achieved through the use of a novel master control panel as herein disclosed. In accordance with one embodiment of the present invention, the invention includes a unified controller for controlling a loading dock apparatus comprising a control panel for providing a common area for operator controls and signals; operator signal lights located on the control panel and operatively connected to the loading dock apparatus for signaling an operator that a loading dock is at least one of ready for loading, not ready for loading, and operator be cautioned; a selector switch located on the control panel, and operatively connected to the loading dock apparatus to permit selective operation of a vehicle restraint, a dock door, and a leveler apparatus; a first operation control attached to the control panel wherein the first operation control engages the vehicle restraint when the selector switch is selected to operate the vehicle restraint, the first operation control opens the dock door when the dock door is selected by the selector switch, and the first operation control controls the raising and lowering of the dock leveler to an operative and a stored position, and extends and retracts a lip portion of the dock leveler when the dock leveler is selected by the selector switch; a second operation control attached to the control panel, wherein the second operation control extends a lip portion of the dock leveler when the dock leveler is selected by the selector switch, the second operation control closes the dock door when the dock door is selected by the selector switch, the second operation control disengages the vehicle restraint when the selector switch is selected to operate the vehicle restraint, and; a third operation control attached to the control panel, wherein the third operation control is an emergency stop control configured to stop operation of the loading dock apparatus; operator indicator lights located on the control panel, wherein the indicator lights indicate which of the vehicle restraint, door, and dock lever the operation controls will activate; and a vehicle restraint bypass switch located on the controller, wherein the vehicle restraint bypass switch may selectively bypass the dock loading apparatus causing the first operation control to not engage the vehicle restraint, but activate the operator control signal light to indicate at least one of ready for loading, and operator be cautioned, and the second operation control to not disengage the dock loading apparatus.

In accordance with another embodiment of the present invention, the invention includes a controller for controlling a loading dock apparatus, the apparatus including a vehicle restraint, a door, a loading light, a dock leveler, the controller comprising a control panel for providing a common area for operator controls and signals; operator signal lights located on the control panel and operatively connected to the loading dock apparatus for signaling an operator that a loading dock is at least one of ready for loading, not ready for loading, and operator be cautioned; selector switch located on the control panel, and operatively connected to the loading dock apparatus to permit selective operation of a vehicle restraint, a dock door, and a leveler apparatus; a means for controlling the loading dock apparatus, the means attached to the control panel, wherein the means controls the vehicle restraint when the selector switch is selected to operate a vehicle restraint, the means controls a dock door when the dock door is selected by the selector switch, and the means controls a dock leveler when the dock leveler is selected by the selector switch; an emergency stop control attached to the control panel, configured to stop operation of the loading dock apparatus; operator indicator lights located on the control panel, wherein the indicator lights indicate which of the vehicle restraint, door, and dock lever the operation controls will activate; and a vehicle restraint bypass switch located on the controller, wherein the vehicle restraint bypass switch may selectively bypass the dock loading apparatus causing the means to not control the vehicle restraint, but activate the operator control signal light to indicate at least one of ready for loading, and operator be cautioned, when the vehicle constraint is engaged or bypassed and control signal light to indicate that the dock is not ready for loading when the vehicle restraint is not engaged and not bypassed.

In accordance with another embodiment of the present invention, the invention includes a method of controlling a loading dock apparatus with a single unified controller comprising configuring a first and second operation control to control a dock door by selecting a dock door option with a selecting switch; operating a dock door by operating the first operation control to open the dock door and operating the second operation control to close the dock door; configuring the first and second operation control to operate a dock leveler by selecting a dock leveler option with the selecting switch; operating a dock leveler by raising and lowering a dock leveler by operating the first operation control and extending and retracting a lip portion of the dock leveler and extending a lip portion of the dock leveler by operating the second operation control.

In accordance with another embodiment of the present invention, the invention includes a control panel for a loading dock apparatus comprising; an operator means located on the control panel for operating a loading dock apparatus, a controller means associated with the control panel for causing the operator means to operate at least two of a vehicle restraint, a loading dock door, a loading dock door seal, and a dock leveler and lip in a predetermined sequence, wherein the operator means, when activated, activates the loading dock apparatus to be operated next in a predetermined sequence.

In accordance with another embodiment of the present invention, the invention includes a control panel for a loading dock apparatus comprising; an operator means located on the control panel for operating a loading dock apparatus, a selector means located on the control panel for selection between at least two of a vehicle restraint, a loading dock door, a loading dock door seal, and a dock leveler and lip, wherein the selector means causes the operator means, when activated, to operate the loading dock apparatus that is selected by the selector means.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENTS OF THE INVENTION

Figure 1:
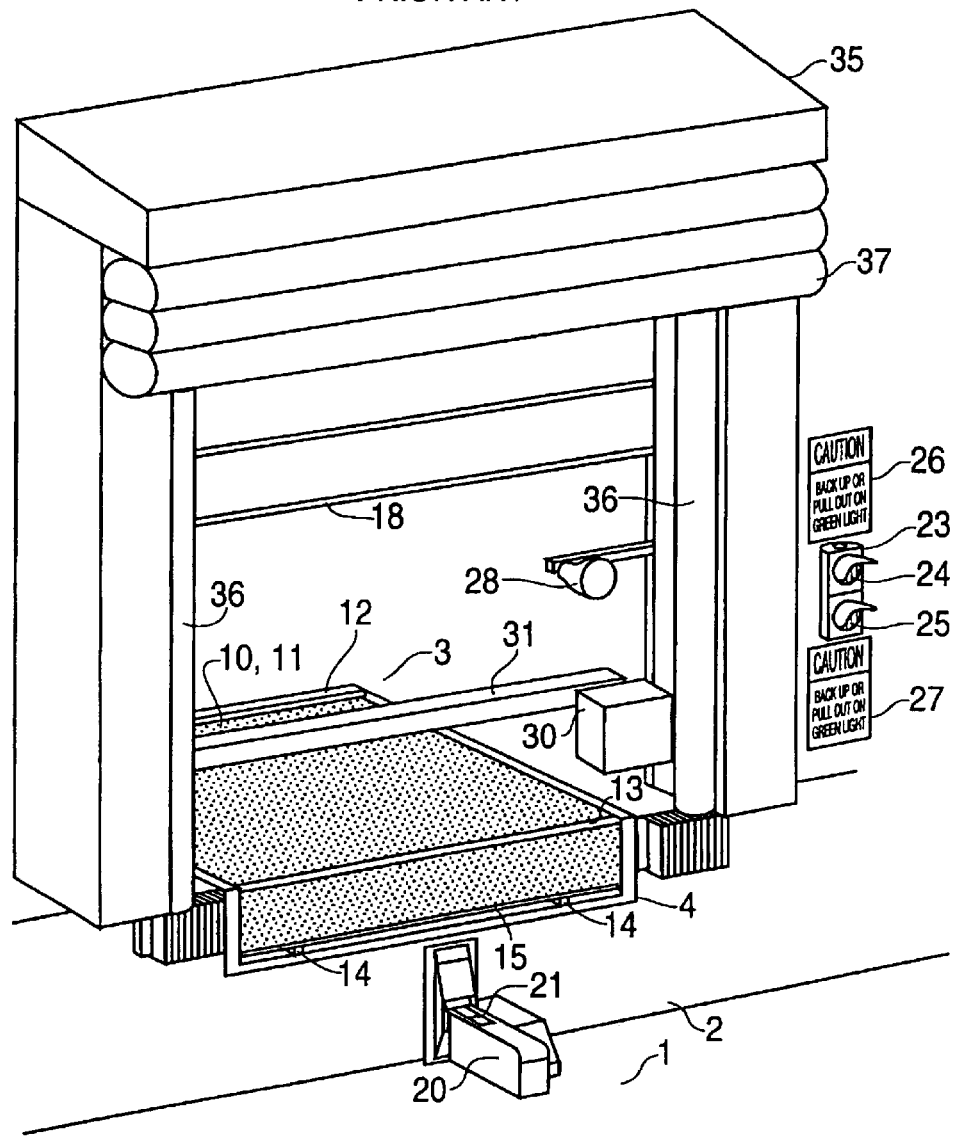
FIG. 1 a perspective view of a loading dock with dock leveler, door, vehicle restraint, barrier gate, loading light and inflatable shelter.
Figure 2:
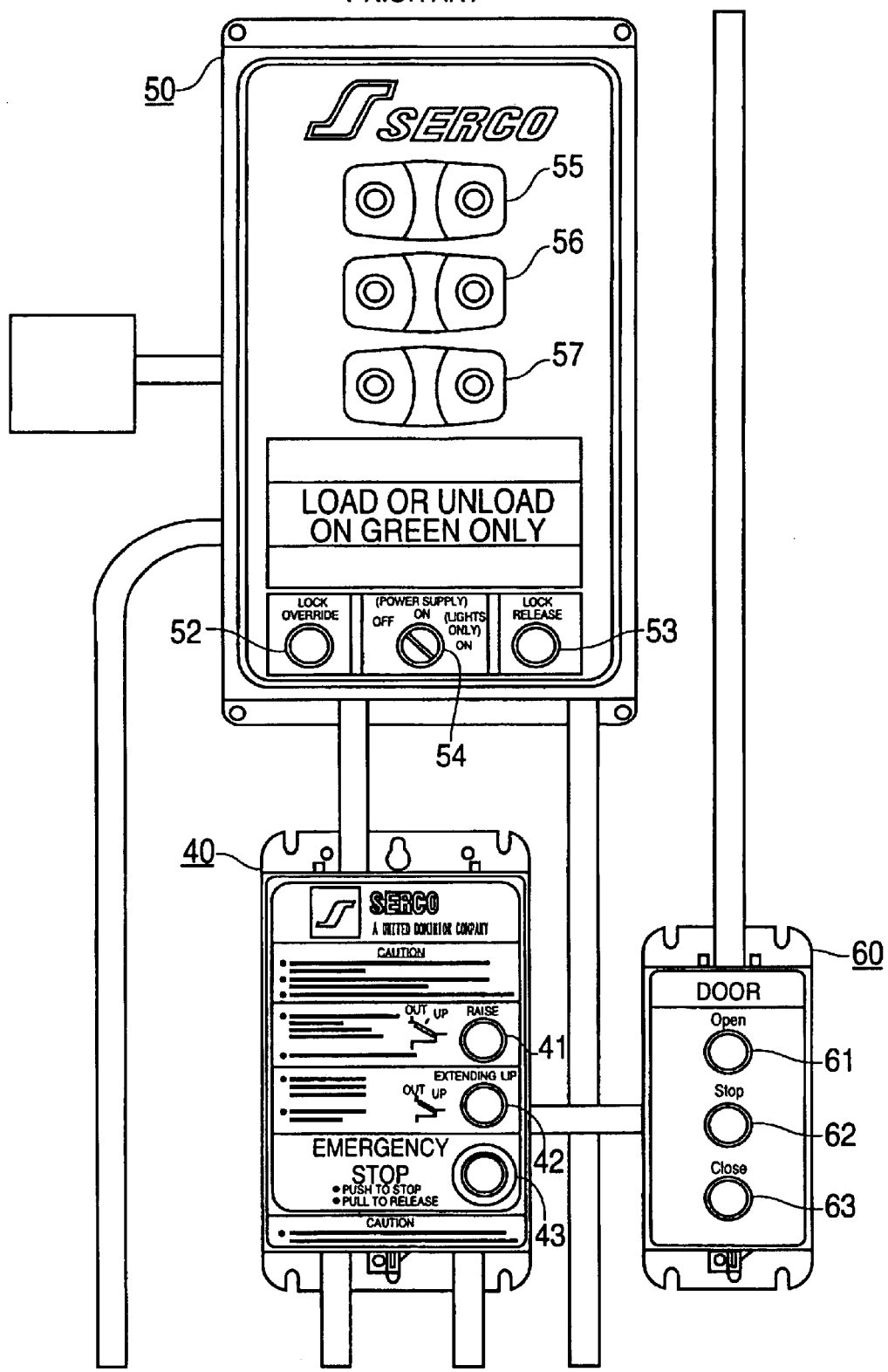
FIG. 2 is a front view of a typical dock wall with multiple control panels.
Figure 3:
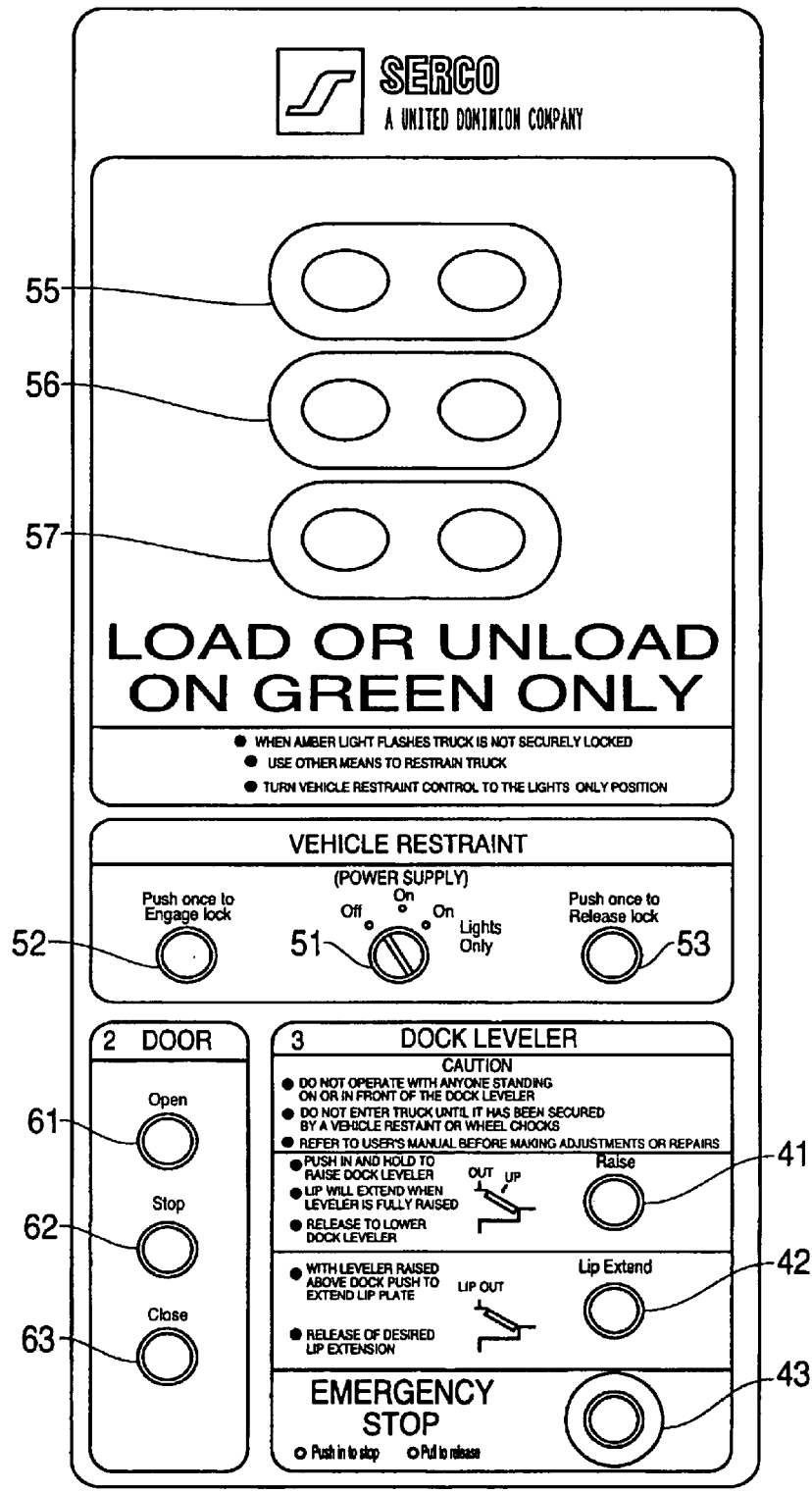
FIG. 3 is a front view of combination control panel having multiple controls for different pieces of equipment.
Figure 4:
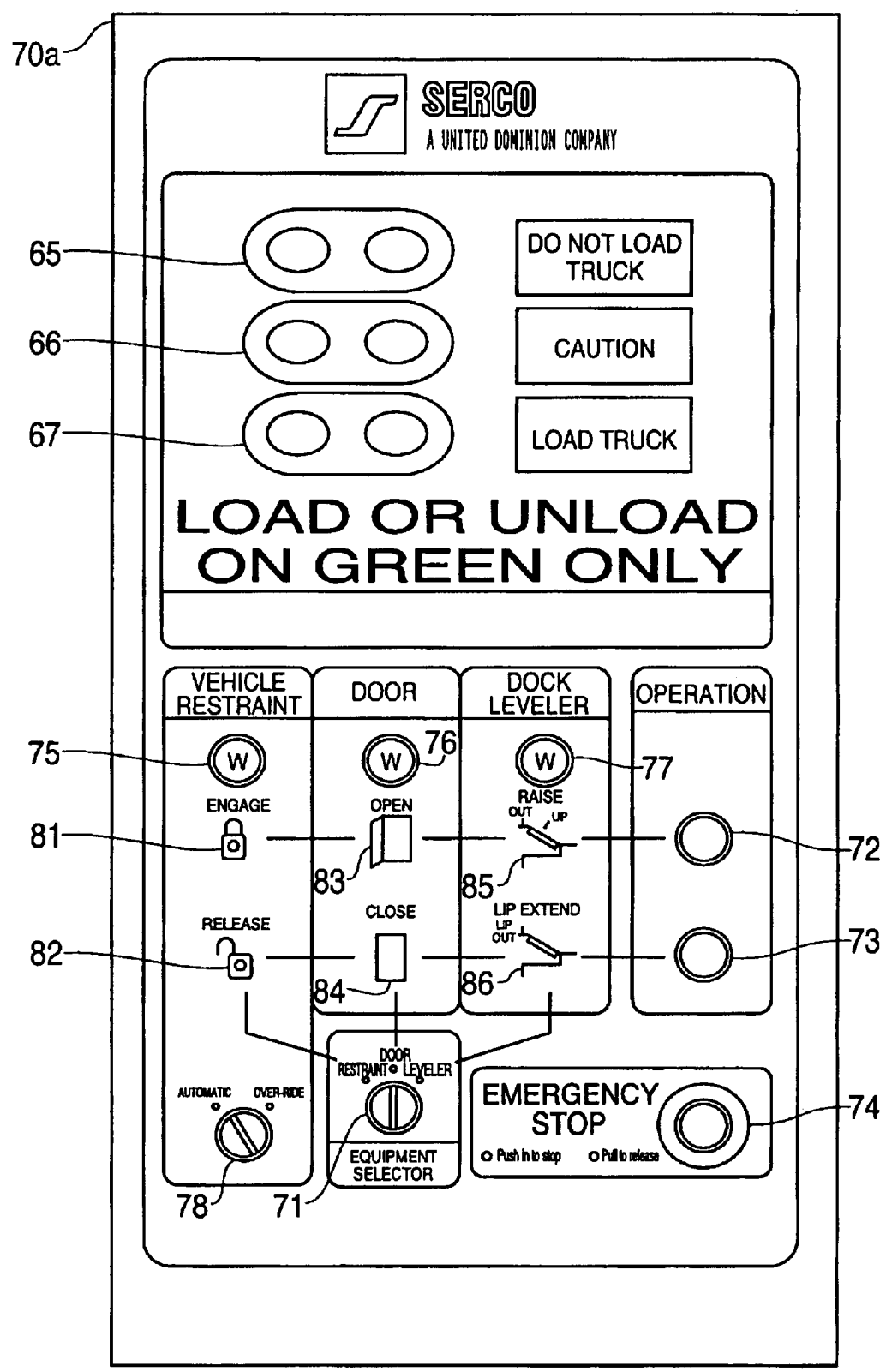
FIG. 4 is a front view of one optional embodiment of a combination control panel in accordance with the invention with a simplified operating sequence.

In accordance with a first optional embodiment of the invention, FIG. 4 shows a control panel 70a which operates a hydraulic dock leveler 10, FIG. 1, vehicle restraint 20 and power operated door 18. The panel has a selector switch 71 with three positions, Restraint, Door, Dock Leveler, push buttons 72, 73 and 74, (which may be referred to as operation controls, in other embodiments the operation controls may include other types of operation controls than push buttons such as levers, switches, turn key operators or other common input devices) and three indicator lights 75, 76, 77. An array of 6 operating symbols 81 through 86 indicate the operational functions of each button. Three lights 65, 66 and 67 (which may be referred to as operator signal lights) which are red, amber and green respectively, indicate to the dock operator the status of the vehicle restraint. A selector switch 78 provides an bypass for the vehicle restraint 20 similar to the Lights Only position of the selector switch 51 on the conventional vehicle restraint control panel 50.

The normal operating sequence of the dock equipment is in the same order as described above, but there are fewer control buttons and the operation sequence is presented in a more logical sequence. The interior lights 65, 66 and 67, and the exterior lights 24 and 25 have the same functions for all of the control panels in this application and will not be described again.

The operator turns the selector switch 71 to Restraint. The indicator light 75 is illuminated to indicate that the symbols for the vehicle restraint, 81 and 82 in the first column, are in effect.

The operator presses the button 72 to cause the vehicle restraint hook 21 to rise and engage the truck or trailer.

The operator turns the selector switch 71 to Door. The indicator light 76 is illuminated to indicate that the symbols for the door, 83 and 84 in the second column, are in effect.

The operator presses the button 72 to open the door 18.

The operator turns the selector switch 71 to Dock Leveler. The indicator light 77 is illuminated to indicate that the symbols for the dock leveler, 85 and 86 in the third column, are in effect.

The operator presses the button 72 to raise the deck assembly 11, extend the lip assembly 15, and releases the button to lower the leveler onto the truck or trailer. Pressing the button 73 allows faster operation by causing the lip assembly 15 to extend before the deck assembly 11 is fully raised.

When the loading operation is finished, the operating sequence is reversed.

The operator presses the button 72 to raise the deck assembly 11 and retract the lip assembly 15 and then releases the button to lower the leveler 10 to the stored position with the lip assembly 15 resting on the lip keepers 14.

The operator turns the selector switch 71 to Door. The indicator light 76 is illuminated to indicate that the symbols for the door are in effect.

The operator presses the button 73 to close the door 18.

The operator turns the selector switch 71 to Restraint. The indicator light 75 is illuminated to indicate that the symbols for the vehicle restraint are in effect.

The operator presses the button 73 to cause the vehicle restraint hook 21 to lower to release the truck or trailer.

The three positions of the selector switch 71 and illumination of the lights 75, 76 and 77 clearly separate the functions of the various devices and illustrate the proper operational sequence.

Description of a Second Optional Embodiment.

Figure 5:
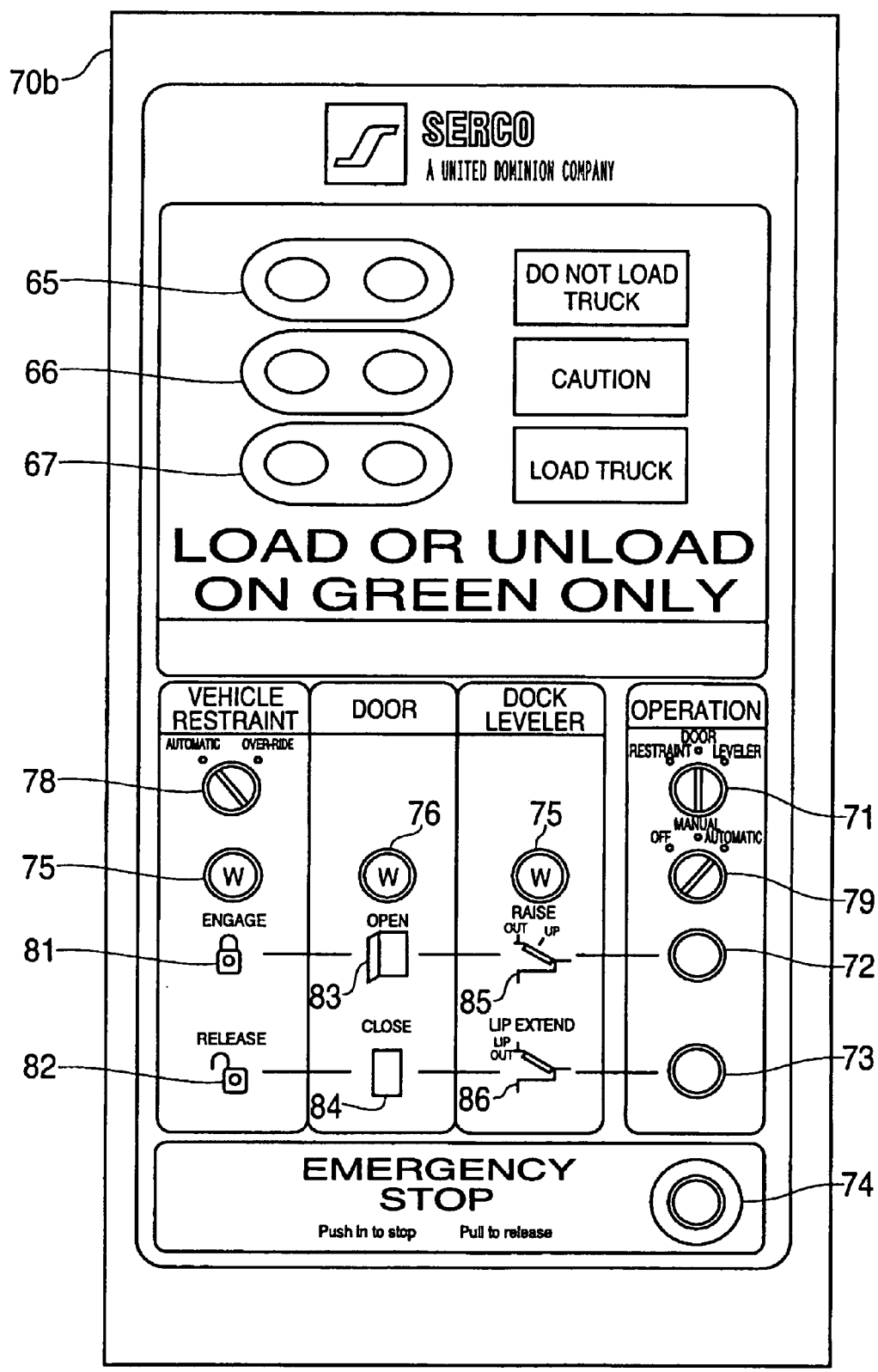
FIG. 5 is a front view a second optional embodiment of combination control panel in accordance with the invention with a simplified operating sequence.

FIG. 5 shows a control panel 70b which is similar to the panel 70a in FIG. 4 but has additional functions. The panel has selector switches 71 and 78, push buttons 72, 73 and 74, and three indicator lights 75, 76, 77. An array of 6 operating symbols 81 through 86 indicate the operational functions of each button. In addition there is a selector switch 79 which has 3 positions Off, Automatic and Manual. Turning the selector switch 79 to the Off position shuts off electrical power to the entire control panel 70b. When the selector switch 79 is turned to Manual, the three positions of selector switch 71 (Restraint, Door, Leveler) have the same functions as previously described for panel 70a. Turning the selector switch 79 to the Automatic position provides a simplified, more automated sequence of operations. When the vehicle restraint 20 is stored, the indicator light 75 is illuminated to indicate that the symbols for the vehicle restraint, 81 and 82 in the first column, are in effect.

The operator presses the button 72 to cause the vehicle restraint to engage the truck or trailer.

When the vehicle restraint 20 has engaged the truck or trailer, the indicator light 76 is automatically illuminated to indicate that the symbols for the door, 83 and 84 in the second column, are in effect.

The operator presses the button 72 to open the door 18.

When the door 18 has opened or begins to open, the indicator light 77 is automatically illuminated to indicate that the symbols for the dock leveler, 85 and 86 in the third column, are in effect.

The operator presses the button 72 to place the leveler on the truck or trailer. Pressing the button 73 allows faster operation by causing the lip 15 to extend before the leveler 10 is fully raised.

When the loading operation is finished, the operating sequence is reversed.

The operator presses the button 72 to raise the leveler, fold the lip 15 and then releases the button to lower the leveler 10 to the stored position.

When the leveler 10 is properly stored, the indicator light 76 is automatically illuminated to indicate that the symbols for the door are in effect.

The operator presses the button 72 to close the door 18.

When the door 18 is fully closed, the indicator light 75 is illuminated to indicate that the symbols for the vehicle restraint 20 are in effect.

The operator presses the button 73 to cause the vehicle restraint 20 to release the truck or trailer.

Thus the entire operational sequence can be performed by simply pressing buttons 72 and 73 in the proper sequence as indicated by the lights 75, 76 and 77 and the graphical symbols 81 through 86 associated with each button.

Description of a Third Optional Embodiment.

Figure 6:
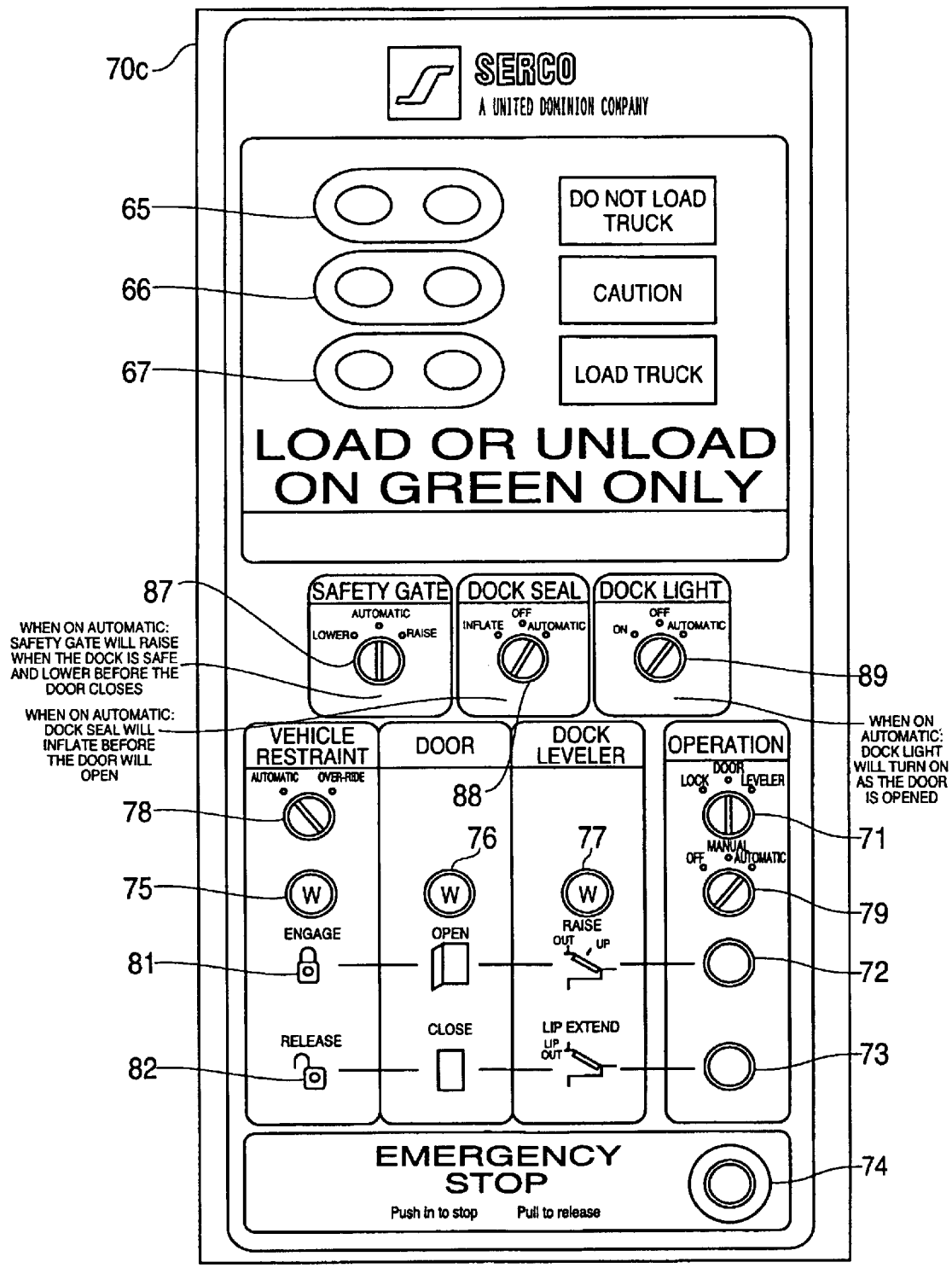
FIG. 6 is a front view of a third optional embodiment of a combination control panel in accordance with the invention with a simplified operating sequence.

FIG. 6 shows a control panel 70c which is similar to the panel 70b in FIG. 4 but has additional functions. The panel has selector switches 71 and 78, push buttons 72, 73 and 74, and three indicator lights 75, 76, 77. The selector switches 71 and 78 have the same positions and functions as previously described. This control panel also controls additional equipment including a barrier gate 31, an inflatable shelter 35 and a loading light 28. Selector switch 87 has three positions Raise, Automatic and Lower. When the Automatic position is selected, the barrier gate 31 is automatically raised (also referred to as disengaged) when vehicle restraint 20 has secured the truck or trailer and automatically lowers (also referred to as engaged) before the vehicle restraint 20 releases the truck or trailer. It is to be understood that while the barrier is shown in FIG. 1 as a gate, in other embodiments of the invention the barrier could be in forms other than a gate. In embodiments with other types of barriers the controller will engage and disengage the barrier. Similarly, selector switch 88 has three positions Off, Automatic and On to control the inflatable shelter 35. When the Automatic position is selected, the shelter 35 is automatically inflated when the door 18 is opened and is allowed to deflate when the door 18 is closed. When the Off position is selected, the shelter 35 is disabled, and remains off when the remaining dock loading apparatus is operating.

Selector switch 89 has three positions Off, Automatic and On to control the loading light 28. When the Automatic position is selected, the loading light 28 is automatically turned on when the door 18 is opened and is turned off when the door 18 is closed. When the Off position is selected the loading light 28 is disabled and remains off when the remaining dock loading apparatus is operating.

Figure 10:
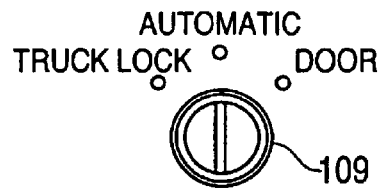
FIG. 10 is a front view of an optional selector switch for selecting different operating modes.

The Raise and Lower positions of selector switches 87, and the Off and On positions of selector switches 88 and 89 allow manual control of the barrier gate 30, the inflatable shelter 35 and the loading light 28. For example, the operator may wish to leave the door 18 open and the shelter 35 to remain deflated for ventilation in hot weather, or the selector switches may be used to manually operate each device independently for inspection or maintenance. Also, a selector switch 107 as shown in FIG. 10 may be included on the control panel 70c. This selector switch 70 may have positions Manual and Automatic. When the Manual position is selected, the door 18 can be left open for ventilation in hot weather. When the selector switches are all set to Automatic, the operation is now:

When the vehicle restraint is stored, the indicator light 75 is illuminated to indicate that the symbols for the vehicle restraint, 81 and 82 in the first column, are in effect.

The operator presses button 72 to cause the vehicle restraint 20 to engage the truck or trailer.

When the vehicle restraint 20 has engaged the truck or trailer, the barrier gate 30 automatically raises and the indicator light 76 is automatically illuminated to indicate that the symbols for the door, 83 and 84 in the second column, are in effect.

The operator presses the button 72 to open the door 18.

When the door 18 starts to open, the inflatable shelter 35 automatically starts to inflate. When the door 18 has fully opened, the loading light 28 is automatically turned on and the indicator light 77 is automatically illuminated to indicate that the symbols for the dock leveler, 85 and 86 in the third column, are in effect.

The operator presses the button 72 to raise the leveler 10 and releases the button 72 to lower the leveler on to the truck or trailer. Pressing the button 73 allows faster operation by causing the lip 15 to extend before the leveler 10 is fully raised.

When the loading operation is finished, the operating sequence is reversed.

The operator presses button the 72 to raise the leveler 10, fold the lip 15 and then releases the button to lower the leveler 10 to the stored position.

When the leveler 10 is properly stored, the indicator light 76 is automatically illuminated to indicate that the symbols for the door are in effect.

The operator presses the lower button 73 to close the door 18. As the door 18 starts to close, the loading light 28 is automatically turned off.

When the door 18 is fully closed, the inflatable shelter motor stops and the shelter 35 starts to deflate, and the indicator light 75 is illuminated to indicate that the symbols for the vehicle restraint are in effect.

The operator presses button 73 to cause the vehicle restraint 20 to release the truck or trailer. The barrier gate 30 automatically lowers and then the vehicle restraint 20 releases the truck or trailer.

Thus the entire operational sequence can be performed by simply pressing buttons 72 and 73 in the proper sequence as indicated by the lights 75, 76 and 77 and the graphical symbols associated with each button.

Although the door 18 and inflatable shelter 35 operation can be controlled automatically, additional selector switches 106 and 88 can provide over-ride functions to allow the door 18 to remain open or the inflatable seal 35 to remain deflated for ventilation in hot weather.

It is evident from the previous descriptions that there can be many variations in the dock equipment and sequence of operations. However, having multiple functions provided by the repeated presses of a single button provides control of the sequences and simplifies the operation.

Automatic Control for Loading Dock Equipment.

Description of a Fourth Optional Embodiment.

Figure 7:
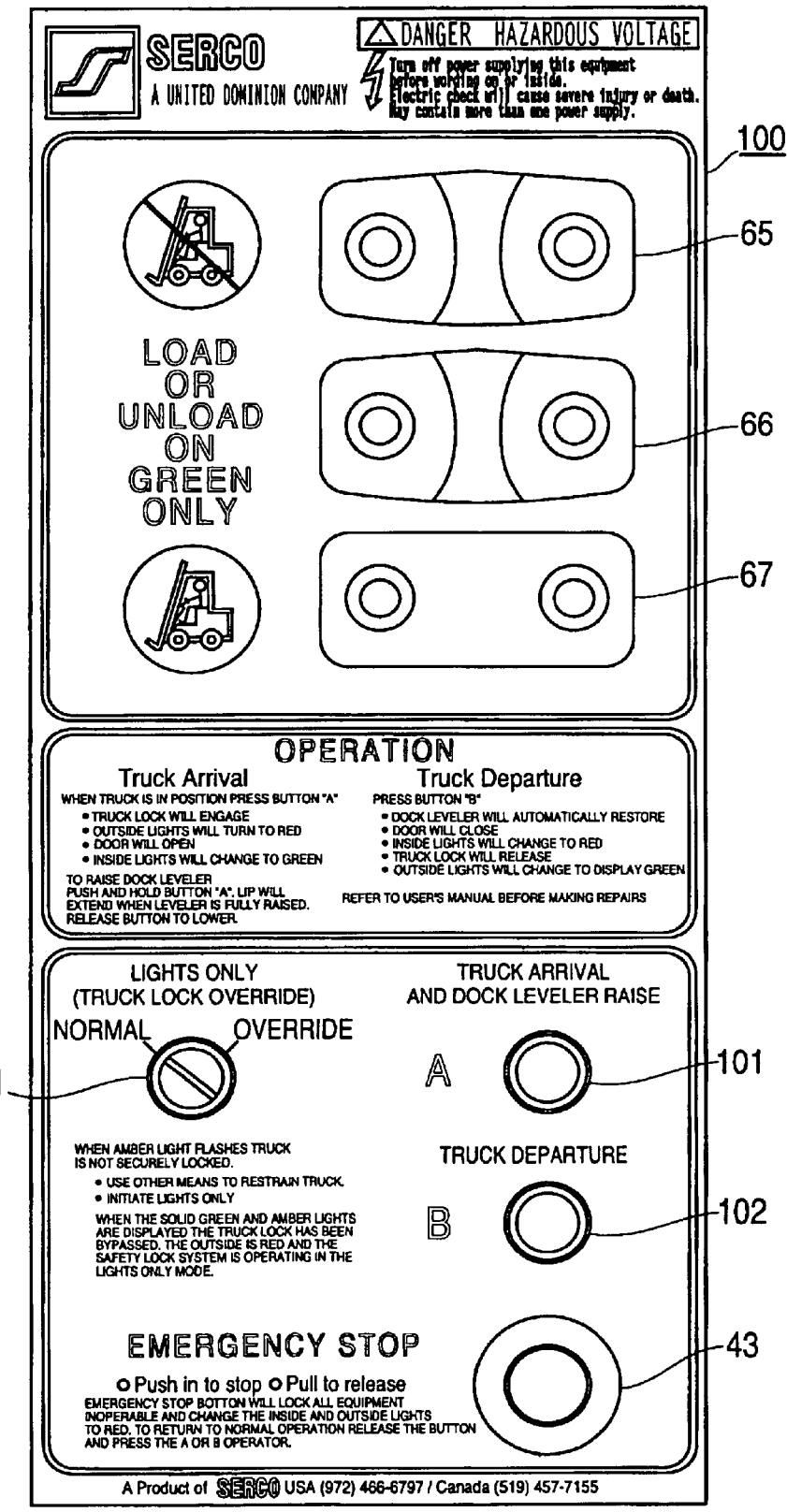
FIG. 7 is a front view of a fourth optional embodiment of a combination control panel in accordance with the invention with automatic features.

FIG. 7 shows a control panel 100 which has an even more simplified operation sequence. Three lights 65, 66 and 67 which are red, amber and green respectively, indicate to the dock operator the status of the dock equipment. The inside red light 65 indicates that the truck or trailer is not ready to load, and the inside green light 67 indicates that the truck or trailer is ready to load. The inside amber light 66, either steady or flashing, may be used to indicate a truck present, operator be cautioned, or error conditions. The selector switch 51 has two positions, Normal and Lights Only which bypasses the vehicle restraint 20 if the truck or trailer cannot be secured by the vehicle restraint 20. The selector switch 51 may be momentarily in the Over-Ride position, then return by spring or other means to the Normal position. A push button could be used in place of the selector switch.

This control panel 100 may control many loading dock devices which could include a vehicle restraint 30, door 18, barrier gate 30, inflatable shelter 35 and a loading light 28. The control panel 100 also has two push buttons, 101 labeled "A" and 102 labeled "B". The push button 43 operates a maintained contact Emergency Stop switch.

Operation of the equipment is controlled by a programmable controller. Such devices are well known in the industry and will not be described in detail. The basic requirement is that each piece of dock equipment has sufficient limit switches or sensors which send signals to the controller to indicate the state of equipment. The controller then sends signals to enable the motors or actuators for the various devices. For example, a vehicle restraint 20 usually requires 3 sensors, one each to indicate that the vehicle restraint 20 is stored, fully raised, and whether the ICC bar of the truck or trailer has been engaged. Similarly a door 18 usually requires at least 2 sensors, one to indicate that the door 18 is closed, and another to indicate that it is fully opened. However a manually operated door 18 may require only one sensor to indicate whether it is fully opened, or raised high enough to clear the operating range of the dock leveler 10. When the proper conditions have been achieved, the controller will then enable the motors or actuators which operate the next device. Such a control system is very flexible and is not limited to specific devices or specific operational sequences.

The sequence of operations will be described for a dock which has a vehicle restraint 20, power operated door 18, barrier gate 30, inflatable shelter 35, loading light 28. Note that this document merely describes envisioned typical sequences of operations. In practice, sequences may be modified in accordance with the invention to suit a specific customer requirement.

After a truck or trailer has been positioned at the dock door 18, the operator presses the Arrival button 101 marked "A". The vehicle restraint 20 then starts to raise the restraining hook 21, and the outside lights 23 change from green to red to indicate that the driver should not move the vehicle. If the hook 21 cannot engage the ICC bar, the inside red and amber lights 55 and 56 will alert the operator. The operator should then secure the truck with manual wheel chocks or other means, and then turn the selector switch 51 to the Override position to continue the operation. If the ICC bar is secured, the operation will continue automatically. When the vehicle restraint 20 has engaged the trailer, the controller will then send a signal to raise the door 18. As the door 18 starts to open, the controller will start the blower motor for the inflatable shelter 35. When the door 18 is fully opened, the controller will raise the barrier arm 31 to allow access to the truck or trailer, and turn on the loading light 28. When the barrier 31 is fully raised, the inside green light 67 will indicate that the dock is ready to use. The operator may now use the button 101 marked "A" to raise the dock leveler.

When the loading operation is finished, the operating sequence is reversed. The operator presses the "Truck Departure" button 102 marked "B" to initiate the sequence. The dock leveler 10 automatically raises to fold the lip 15 and lowers to the stored position. When the leveler 10 is properly stored, the operator again presses the button 102 marked "B" and the entire sequence will be reversed to lower the barrier, close the door 18 and release the vehicle restraint 20. Additional operating enhancements may be included in the control program. For example, the controller may require that the "Truck Departure" button be held for several seconds before the restoring sequence begins. This would prevent operation by someone inadvertently pressing the button. Also, an audible alarm may be energized when the "Truck Departure" button is pressed to warn dock workers that the door is about to close and the truck will be released. Other enhanced features may include a time delay before releasing the vehicle restraint to ensure that the inflatable shelter has had time to deflate.

Also, at any time the operator may push the Emergency Stop button 43. This will stop all operation of the equipment. When the problem has been resolved, the operator will pull out Emergency Stop button 43 and then may press the "A" button to continue the operation or press the "B" button to restore the equipment to the initial state. Thus the entire operational sequence can be performed by simply pressing the buttons 101 and 102 without requiring the operator to make decisions about the sequence of operations.

Although this control system makes the operation very simple, it does not prevent the flexibility required for maintenance or special operating needs. This control system has the ability to provide special operating sequences.

Figure 8:
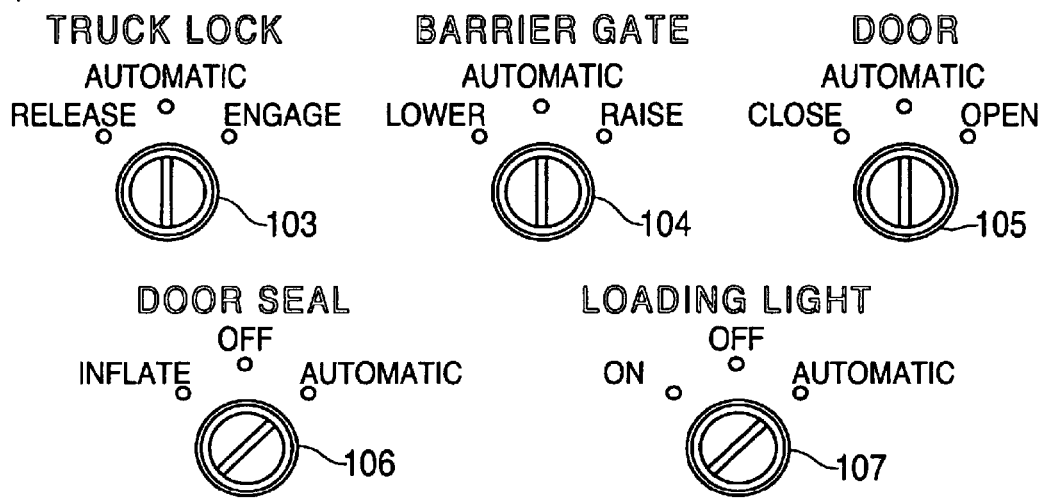
FIG. 8 is a front view of several optional manual select switches.

For maintenance, there is often a requirement for independent operation of a specific device. For example, if the vehicle restraint 20 malfunctions, there is a requirement to operate the vehicle restraint 20 independently without initiating the door open sequence. FIG. 8 shows several selector switches which allow independent operation of the equipment used in the sequence described previously.

Figure 9:
FIG. 9 is a front view of an optional configuration of manual select switches.

Because maintenance or selection of special operating features is usually restricted to more skilled or supervisory personnel, these switches may be mounted on the exterior of the control panel 70a, 70b, 70c, 100 and may be controlled by keyed switches or they may be mounted inside the control panel 70a, 70b, 70c, 100 for use only by maintenance personnel. Also, instead of a rotary style selector switch, other configurations, such as a slide switch 108 shown in FIG. 9, may be used for many of the switches described herein.

Operation of the maintenance switches will be described. Selector switch 103 controls the operation the vehicle restraint 20. With the selector switch 103 in the Automatic position, operation is controlled by the programmable controller. Turning the selector switch 103 to the right or left causes the vehicle restraint 20 to be raised or lowered by the maintenance technician. Similarly the selector switches 104, 105, 106, and 107 provide manual control of the barrier gate 30, door 18, door seal 35 and loading light 28.

In the case of the dock light 28 and inflatable door seal 35, the manual control of off for those features will cause the dock light 28 and door seal 35 to be disabled, and the controller will ignore the dock light 28 and door seal 35 to be disabled, and the controller will ignore the dock light 28 and door seal 35 while automatically controlling the other devices through their normal sequences.

FIG. 10 shows a simplified configuration with only a vehicle restraint 20, door 18 and dock leveler 30. Instead of a separate selector switch for each device, a single selector switch 109 allows use of the "A" and "B" buttons, 101 and 102, to raise or lower the device. Note that no selector switch position is required for the dock leveler because the selector switch 51 allows vehicle restraint bypass and the door must be open before the dock leveler is used.

In addition to operation for maintenance, the selector switches may also be used to bypass or override any device. For example, the selector switch 105 may be used to manually control opening and closing of the door 18 for maintenance purposes. However, in some climates there may be a desire to leave the door 18 open on hot days. By turning the selector switch 105 to the "Open" position, the door 18 will remain open and the controller will ignore the door 18 while automatically controlling the other devices through their normal sequences. Similarly the other devices such as the barrier gate 30, door seal 35 and loading light 28 may be manually controlled.

An optional feature of any of the embodiments may include a selector switch (not shown) which permits an operator to operate different dock bays with the same control panel. For example the selector switch may permit an operator to select bay A, B, C, or the like.

While specific labels have been applied to positions of the various selector switches and controls, those labels are meant to generally characterize the functions that will occur when various positions are selected. The specific labels themselves are not meant to be limiting the invention to switches with those specific labels.

It is evident from the previous descriptions that there can be many variations in the dock equipment and sequence of operations. The number of devices and operations is limited only by the number of input and output terminals on the controller. Having the functions operate automatically in the correct sequence simplifies the operation of dock equipment for unskilled operators. The specific embodiments described herein are exemplary. Features described herein may be added or deleted according to customer requirements and remain within the scope of the invention.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An automatic loading dock controller, comprising:
   (a) a control panel for providing a common area for operator controls and signals;
   (b) operator signal lights located on the control panel and operatively connected to the loading dock apparatus for signaling an operator that an automatic loading dock is at least one of ready for loading, not ready for loading, and operator be cautioned;
   (c) a first operation control attached to the control panel, wherein the first operation control, when activated, engages a vehicle restraint, opens a dock door, raises a dock leveler and lowers the dock leveler to an operative or stored position, and extend and retract a lip portion of the dock leveler;
   (d) a second operation control attached to the control panel, wherein the second operation control, when activated, closes a dock door, and disengages a vehicle restraint;
   (e) a programmable controller configured to selectively cause the first operation control to control the vehicle restraint, the dock door and the dock leveler according to a preprogrammed program, and selectively cause the second operation control to control a lip portion of a dock leveler, close the dock door and disengage a vehicle restraint according to a preprogrammed program;
   (f) a third operation control attached to the control panel, wherein the third operation control is an emergency stop control configured to stop operation of the loading dock apparatus; and
   (g) a vehicle restraint bypass switch located on the control panel, wherein the vehicle restraint bypass switch is configured to selectively bypass the dock loading apparatus causing the controller to not engage and disengage the vehicle restraint to a vehicle, but activate the operator control signal light to indicate at least one of loading dock ready for loading, operator be cautioned; and loading dock not ready for loading, and proceed with a next operation in a sequence of operations.

2. The automatic loading dock controller of claim 1, further comprising a selectable manual bypass vehicle restraint control configured to select between at least one of release, automatic, and engage, wherein when the selectable manual vehicle control set for release, the vehicle restraint disengages when the selectable manual vehicle control is set for automatic, the vehicle control performs according to a predetermined schedule, and when the vehicle release control is set for engage, the vehicle release engages.

3. The automatic loading dock controller of claim 1, further comprising a selectable manual override door control configured to select between at least one of close, automatic, and open, wherein when the selectable manual door control is set for close, the dock door closes, when the selectable manual door control is set for automatic, the dock door performs according to a predetermined schedule, and when the door control is set for open, the dock door opens.

4. The automatic loading dock controller of claim 1, further comprising a selectable manual override loading light control configured to select between at least one of on, automatic, and off, wherein when the selectable manual loading light control is set for on, a loading light turns on, when the selectable manual loading light control is set for automatic, the loading light turns on when the dock door opens and turns off when the dock door closes, and when the loading light control is set for off, the loading light turns off.

5. The automatic loading dock controller of claim 1, wherein the controller also controls a barrier gate, when the vehicle restraint is engaged or bypassed, the barrier gate disengages, when the vehicle restraint is disengaged, the barrier gate engages.

6. The automatic loading dock controller of claim 5, further comprising a selectable manual override barrier gate control configured to select between at least one of engage, automatic, and disengage, wherein when the selectable manual barrier gate control set for engage, the barrier gate is engaged, when the selectable manual barrier gate control is set for automatic, the barrier gate performs according to a predetermined schedule, and when the barrier gate control is set for disengage, the barrier gate control disengages.

7. The automatic loading dock controller of claim 1, wherein the controller further controls a door seal, wherein the door seal automatically inflates when the vehicle restraint engages or bypassed, and deflates when a vehicle restraint is disengaged.

8. The automatic loading dock controller of claim 7, further comprising a selectable manual override door seal control configured to select between at least one of inflate, automatic, and off, wherein when the selectable manual door seal is set for inflate, the door seal inflates when the selectable door seal is set for automatic, the door seal performs according to a predetermined schedule, and when the door seal control is set for off, the door seal deflates.

9. The controller of claim 1, further comprising a selector switch located on the control panel for selectively operating docking loading apparatus for different docking bays.

10. An automatic loading dock controller, comprising:
  (a) a control panel for providing a common area for operator controls and signals;
  (b) operator signal lights located on the control panel and operatively connected to the loading dock apparatus for signaling an operator that a loading dock is at least one of ready for loading, not ready for loading, and operator be cautioned;
  (c) means for controlling the docking apparatus attached to the control panel, wherein the means controls a vehicle restraint, controls a dock door, controls a dock leveler, and controls a lip portion of the dock leveler;
  (d) a programmable controller configured to selectively cause the means for controlling the dock loading apparatus to control the vehicle restraint, the dock door, and the dock leveler according to a preprogrammed program;
  (e) an emergency stop attached to the control panel, configured to stop operation of the loading dock apparatus; and
  (f) a vehicle restraint bypass switch located on the controller, wherein the vehicle restraint bypass switch is configured to selectively bypass the dock loading apparatus causing the controller to not engage and disengage the vehicle restraint to a vehicle, but activate the operator control signal light to indicate at least one of loading dock ready for loading, operator be cautioned, and proceed with a next operation in a sequence of operations, when the vehicle restraining apparatus is attached to a vehicle or is bypassed and the operator control signal light to display the signal the loading dock not ready for loading when the vehicle restraining apparatus is not engaged and not bypassed.

11. The automatic loading dock controller of claim 10, further comprising a selectable manual bypass vehicle restraint control configured to select between at least one of release, automatic, and engage, wherein when the selectable manual vehicle control set for release, the vehicle restraint disengages, when the selectable manual vehicle control is set for automatic, the vehicle control performs according to a predetermined schedule, and when the vehicle release control is set for engage, the vehicle release engages.

12. The automatic loading dock controller of claim 10, further comprising a selectable manual override door control configured to select between at least one of close, automatic, and open, wherein when the selectable manual door control is set for close, the dock door closes, when the selectable manual door control is set for automatic, the dock door performs according to a predetermined schedule, and when the door control is set for open, the dock door opens.

13. The automatic loading dock controller of claim 10, further comprising a selectable manual override loading light control configured to select between at least one of on, automatic, and off, wherein when the selectable manual loading light control is set for on, a loading light turns on, when the selectable manual loading light control is set for automatic, the loading light turns on when the dock door opens and turns off when the dock door closes, and when the loading light control is set for off, the loading light turns off.

14. The automatic loading dock controller of claim 10, wherein the controller also controls a barrier gate, when the vehicle restraint is engaged or bypassed, the barrier gate disengages, when the vehicle restraint is disengaged, the barrier gate engages.

15. The automatic loading dock controller of claim 14, further comprising a selectable manual override barrier gate control configured to select between at least one of engage, automatic, and disengage, wherein when the selectable manual barrier gate control set for engage, the barrier gate is engaged, when the selectable manual barrier gate control is set for automatic, the barrier gate performs according to a predetermined schedule, and when the barrier gate control is set for disengage, the barrier gate control disengages.

16. The automatic loading dock controller of claim 10, wherein the controller further controls a door seal, wherein the door seal automatically inflates the vehicle restraint engages or is bypassed, and deflates when a vehicle restraint is disengaged and not bypassed.

17. The automatic loading dock controller of claim 16, further comprising a selectable manual override door seal control configured to select between at least one of inflate, automatic, and off, wherein when the selectable manual door seal is set for inflate, the door seal inflates when the selectable door seal is set for automatic, the door seal performs according to a predetermined schedule, and when the door seal control is set for off, the door seal deflates.

18. The automatic loading dock controller of claim 10, further comprising a selector switch located on the control panel for selectively operating docking loading apparatus for different docking bays.

* * * * *

UNITED STATES PATENT AND TRADEMARK OFFICE
CERTIFICATE OF CORRECTION

PATENT NO.     : 6,975,226 B2
DATED          : December 13, 2005
INVENTOR(S)    : Terence Reynard et al.

It is certified that error appears in the above-identified patent and that said Letters Patent is hereby corrected as shown below:

<u>Title page</u>
Item [56], References Cited, U.S. PATENT DOCUMENTS,
insert -- 4,692,755 A, 9/1987, Hahn, 340/687 --.

Signed and Sealed this

Twenty-eighth Day of March, 2006

JON W. DUDAS
*Director of the United States Patent and Trademark Office*